Dec. 22, 1942.  A. SALZER  2,306,029
OUTPUT REGULATOR FOR AIR AND GAS COMPRESSORS
Filed Nov. 16, 1938

Patented Dec. 22, 1942

2,306,029

UNITED STATES PATENT OFFICE 2,306,029

OUTPUT REGULATOR FOR AIR AND GAS COMPRESSORS

Albert Sälzer, Geisweid, Westphalia, Germany; vested in the Alien Property Custodian Application November 16, 1938, Serial No. 240,664
In Germany November 23, 1937

2 Claims. (Cl. 137—153)

The invention relates to a regulator for air and gas compressors by which their output is regulated in such manner that if the pressure in the consumer's pipe rises in consequence of reduction of the consumption, over a maximum value previously determined, a piston subject on one side to this pressure and loaded on the other side, e. g., by a weight or spring pressure, is moved, and this so controls the compressor that the compressor runs idly until the consumer's pressure in consequence of fresh consumption has again fallen to an amount also previously determined, below this maximum value.

The invention refers more particularly to an improvement in such regulators and is characterised in that the means yieldingly opposing movement of the piston is supplemented by an auxiliary spring device adapted upon a predetermined amount of movement of the piston under the influence of said pressure to change from an opposing load to a load assisting movement of the piston away from the normal position.

In order that this invention may be clearly understood and readily carried into effect a sheet of drawings is appended thereto illustrating an embodiment of the regulator in longitudinal section, and wherein.

Figure 1:
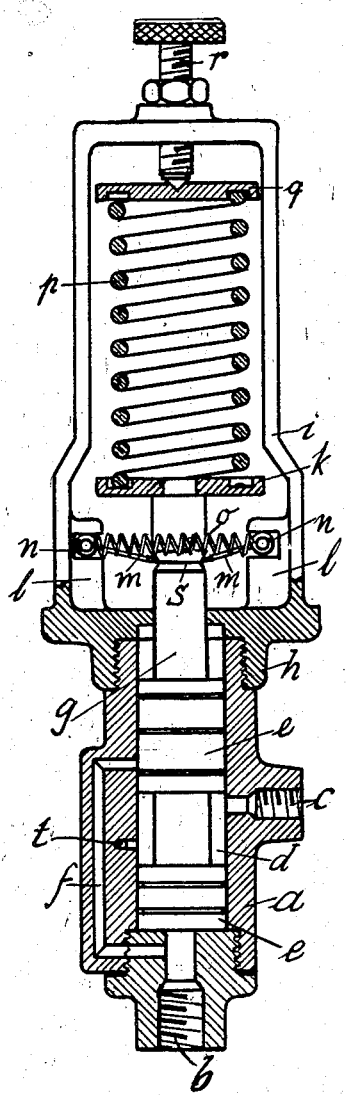
Fig. 1 shows the regulator in the working position.

Referring to the drawing the regulator consists of the piston housing $a$ with the union $b$ for connection to the delivery outlet from the accumulator vessel or to the supply piping, and with the union $c$ for connection to the pipe of the compressor valve. The housing $a$ has a bore $d$ for accommodating a piston $e$, and is also provided with a by-pass conduit $f$. The bore $d$ is connected to the atmosphere by port $t$. The piston housing $a$ is closed at the top by having threaded on to it the boss $h$ of the lower end of the spring housing $i$ through which projects the piston rod $g$, carrying at its upper end a spring supporting plate $k$. Underneath this plate there are fitted firmly at two oppositely located points of the spring housing, guide pieces $l$ with recesses in which are supported on pins $n$ the apertured outer ends or heads of a pair of arms $m$. Across the pins $n$ there are arranged on both sides of the piston rod $g$ a pair of tension springs $o$.

Between the lower spring supporting plate $k$ and an upper one $q$ is supported a main spring in the form of a strong compression spring $p$, preferably a helical spring, the normal effort of which can be adjusted by a screw $r$ threaded through the top of the housing $a$.

A circumferential groove $s$ is provided in the piston rod and receives the inner pointed ends of the arms $m$.

The method of operation of the device is as follows:

On the working of the compressor, the piston $e$ is in the position shown in Fig. 1. The pressure in the accumulator vessel or in the distribution piping acts upon its lower end surface. If this pressure rises to the adjusted maximum pressure, the spring load $p$ at the other side of the piston commences to yield. Thus the piston—in order to be able to move under the increasing pressure—must not only overcome the pressure of the main spring $p$, but also the opposition afforded by the downwardly inclined arms $m$ resting obliquely against the groove $s$ in the piston rod so as to draw further apart the springs $o$ tensioned between the outer ends or heads of the said pins. Smaller temporary increases of pressure in the compressor installation are thus taken up by these springs without the principal spring $p$ affording much opposition of being substantially compressed. If, however, the increase of pressure is so continuous that it draws the springs $o$ apart to such an extent that the longitudinal axes of the two pins are in a straight line, i. e., at dead centre, then from this instant the auxiliary springs $o$ no longer act with the main spring, but in the next instant by an infinitesimal addition to the pressure under the piston, the arms $m$ are urged sharply upwards past dead centre position so that the piston passes suddenly over the rest of its upward course into the idle running position shown in Fig. 2, and is held in this position not only by the working pressure but also by the tension of the auxiliary springs $o$, so that any fluctuations in changing over become impossible.

Figure 2:
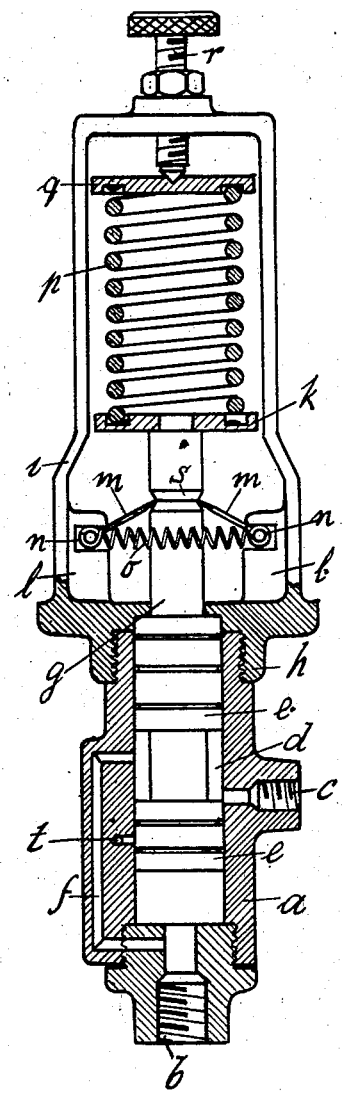
Fig. 2 shows the regulator in idle running position.

In the position of the piston shown in Fig. 2, the by-pass conduit $f$ connects, for example, the working conduit through the piston housing bore $d$ and the connection $c$ with the valve housing of the compressor, so that a device is set in operation which effects the idle running. If now the working pressure falls by a certain amount below the adjusted maximum pressure, the piston can no longer withstand the pressure of the principal spring $p$. The excess pressure of the latter first expands the auxiliary springs $o$ until the pins $m$ are in a line and on the further maintenance of the lower working pressure urges the piston downwards into the normal working position with the assistance of the auxiliary springs and consequently obviates any fluctuations, in which position the valve housing of the compressor or the equivalent device thereof is again cut off from the working pressure, so that the compressor again runs under useful load.

It will be naturally understood, that in place of springs of steel or other suitable metal, other elastic actuating agents such as pressure cushioning tubes or the like can be used.

I claim:

1. In an output regulator, for an air and gas compressor and of the type operated by the pressure in the consumer's service so as to effect idle running of said compressor when said pressure reaches a predetermined maximum, a cylinder having a central inlet and a first lateral outlet, a second lateral outlet leading to the atmosphere and a by-pass leading from said central inlet to a part of the cylinder beyond said lateral outlets, a piston in said cylinder adapted for connecting said first lateral outlet alternately with said second one to atmosphere or with said by-pass and central inlet and being movable by gas pressure therein, resilient means opposing such movement, opposed pivoted snap acting members engaging with an extension from said piston and pivotally and translatively movable through a dead-centre position in conformity with the movement of said piston and spring means connecting said pivoted members and opposing movement of said piston until said dead centre position is reached and thereafter assisting such movement, said piston being formed in such manner, that in either way of movement reversion of said first lateral outlet communicating with the second one to communication with said central inlet or contrariwise only begins after said pivoted snap acting members have passed their dead-centre position.

2. In an output regulator according to claim 1, three ports opening into said cylinder, the first leading to said second lateral outlet, the second to said first lateral outlet and the third to said cylinder inlet, and a small diameter portion on said piston normally allowing interconnection of said first and second ports, said third port normally being closed by said piston, the arrangement being such that movement of said piston, when said dead-centre position is passed and said spring means assist such movement, closes said first port and effects inter-connection between said second and third ports by means of said small diameter portion on the piston.

ALBERT SÄLZER.